US006609158B1

(12) United States Patent
Nevarez et al.

(10) Patent No.: US 6,609,158 B1
(45) Date of Patent: Aug. 19, 2003

(54) COMPONENT ARCHITECTURE IN A COMPUTER SYSTEM

(75) Inventors: Carlos A. Nevarez, Orem, UT (US); Chris Andrew, Highland, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/427,359

(22) Filed: Oct. 26, 1999

(51) Int. Cl.$^7$ ............................................. G06F 15/163
(52) U.S. Cl. ...................................................... 709/316
(58) Field of Search ........................ 709/316; 717/136; 345/746

(56) References Cited

U.S. PATENT DOCUMENTS

| | | | |
|---|---|---|---|
| 5,475,817 A | * 12/1995 | Waldo et al. ............... 709/316 |
| 5,542,086 A | 7/1996 | Andrew et al. ............. 395/600 |
| 5,603,031 A | 2/1997 | White et al. ................ 395/683 |
| 5,692,129 A | 11/1997 | Sonderegger et al. .. 395/200.11 |
| 5,732,270 A | * 3/1998 | Foody et al. ............... 709/316 |
| 5,737,518 A | 4/1998 | Grover et al. .......... 395/183.14 |
| 5,761,499 A | 6/1998 | Sonderegger ............... 395/610 |
| 5,859,978 A | 1/1999 | Sonderegger et al. .. 395/200.56 |
| 5,893,118 A | 4/1999 | Sonderegger ............... 707/203 |
| 5,903,755 A | 5/1999 | Matheson et al. .......... 395/683 |
| 6,016,499 A | * 1/2000 | Ferguson .................... 707/104 |
| 6,044,224 A | * 3/2000 | Radia et al. ................ 717/162 |
| 6,085,030 A | * 7/2000 | Whitehead et al. ......... 709/203 |
| 6,208,345 B1 | * 3/2001 | Sheard et al. .............. 345/356 |
| 6,381,654 B1 | * 4/2002 | Brawn et al. ............... 709/331 |
| 6,438,744 B2 | * 8/2002 | Toutonghi et al. .......... 717/137 |

OTHER PUBLICATIONS

Ron Ben–Natan, "CORBA A Guide to Common Object Request Broker Architecture", 1995, McGraw–Hill, p. 2, 47–48.*
Thomas J. Mowbray, "The Essential CORBA", 1995, John Wiley & Sons, Inc., p. 38–48, 132–149, , 233, 236, 253, 262.*
Shel Sutton, "OMG Internet Platform Special Interest Group", 1997, p. 1–8.*
"ActiveX Magic: An ActiveX Control and DCOM Sample Using ATL", Microsoft Corporation, 1999, pp. 1–10.
"CNET Builder.com", CNET, Inc., 1995–1999, pp. 1–4.
"The COM+ Programming Model Makes it Easy to Write Components in Any Language", Mary Kirtland, Dec. 1997, pp. 1–17.

(List continued on next page.)

Primary Examiner—St. John Courtenay, III
Assistant Examiner—Phuong Hoang
(74) Attorney, Agent, or Firm—Dinsmore & Shohl LLP

(57) ABSTRACT

Methods, configured media, and systems are provided for connecting disparate software components in a network or other computer system. A language adapter maps programming language constructs to a general object-oriented interface. An object model adapter maps the general object-oriented interface to specific object models such as the Java/RMI model or a CORBA model. The system dynamically wraps non-object components, such as scripts, in a object wrapper as needed to make them accessible through the language adapter and the object model adapter. In this manner, a language-vendor-independent bridge is provided between components written in different programming languages, and the components also gain access to objects written in object models favored by various vendors.

24 Claims, 3 Drawing Sheets

OTHER PUBLICATIONS

"HiTecSoft Announces the SMTP Component for Net2000 NMX", HiTecSoft Corp, from Sep. 16, 1996 to 1999, pp. 1–7.

"JavaBeans FAQ: About Glasgow", No later than Jul. 9, 1997, pp. 1–2.

"Mobile Agents White Paper", *General Magic,* 1997–1998, pp. 1–21.

"NDS and Java Together", Art Nevarez, *Novell,* Aug. 26, 1999, pp. 1–4.

"Novell, Java, & Voyager", Art Nevarez, *Enterprise Java,* Mar. 1999, pp. A26–A28.

"Novell Script for NetWare (NSN)", *Novell,* No later than Mar. 4, 1999, p. 1.

"ObjectBridge for R/3–CORBA", Visual Edge Software Ltd., Sep. 4, 1998, pp. 1–5.

"Professional DCOM Programming", Dr. Richard Grimes, Wrox Press Ltd., 1997, pp. 9–47, 143–160.

Various pages on UCS Architecture, *Novell,* Between 1996 and 1999 (Novell SDK may have been released as early as Nov. 1, 1998), pp. 1–21.

"Overview of Voyager: ObjectSpace's Product Family for State-of-the-Art distributed Computing", Graham Glass, *ObjectSpace,* 1999, pp. 1–28.

"The ObjectSpace Voyager Universal ORB", Graham Glass, *ObjectSpace,* 1999, pp. 1–12.

"Reducing Development Effort using the ObjectSpace Voyager ORB", Graham Glass, *ObjectSpace,* 1999, pp. 1–10.

"Java and ActiveX", David S. Linthicum, *Byte,* Sep. 1997, pp. 1–2.

"Microsoft to develop for Unix, Support Attempts to Bridge CORBA, COM Standards", Nate Zelnick, *Internet World,* Feb. 2, 1998, pp. 1–3.

* cited by examiner

COMPONENT ARCHITECTURE IN A COMPUTER SYSTEM

FIELD OF THE INVENTION

The present invention relates to object models, programming languages, and operating system services for use in a computing system. More particularly, the present invention relates to an architecture for supporting programming languages and multiple object models in a computer network with Novell NetWare software.

TECHNICAL BACKGROUND OF THE INVENTION

Computer languages have been proliferating, to the point that there are now hundreds of programming languages, with names ranging at least from "ABC" to "Y". This proliferation is in stark contrast with the situation just a few decades ago when almost all programming was performed in assembly language or in a handful of higher-level languages such as FORTRAN, BASIC, and COBOL. Now dozens of language are in widespread use, with new languages and language versions being created all the time.

More programs tend to be written in newer languages, until these languages themselves age and fade into the background. For instance, FORTRAN was a very popular language in the 1960's for writing scientific applications, while C++ took off in the 1980's with its use of object-oriented programming, and JAVA, used for internet applications, has exploded in popularity since its birth in 1995.

Sometimes new programming languages solve problems more elegantly or simply than previous languages. For example, SQL is quite useful for performing database manipulations, and Java is known for its usefulness when programming Internet applications. Sometimes a program may be most easily written in a specialized language, as when an application for finding solutions to a differential equation is written in the math-oriented language Mathematica. A particular programming language may also be favored because the programmer knows the language well, because the language is readily available, and/or because support for the language exists within a particular organization.

For the foreseeable future programs will continue to be written in many different computing languages, and most computer-using companies will have applications and other programs written in a variety of languages. This can create problems.

For instance, a program written in one language often cannot communicate with a program written in a different language without tedious manual code modifications, and most likely, a round of testing and debugging. Bugs can be introduced into previously acceptable code when converting code from one language to another. Furthermore, some legacy programs may be written in languages that many current programmers never learned. If working programs (many of which have been thoroughly tested and debugged) could be reused without a tremendous amount of work on the part of an individual programmer, then program development and use could be greatly improved.

Many individual scripts or other programs written in a specific programming language could also be helpful in a different context, but there are barriers to their reuse. Sometimes a potential user does not know whether a particular script would be helpful because the user is unfamiliar with the specific instance of code. But more often scripts and other programs could be made available to those who could benefit from their use, if the effort needed to access the existing code in the different environment were not so tedious and time-consuming.

In addition to the proliferation of programming languages and programs written in different languages, reuse of earlier programming efforts is complicated by the fact that computer systems are increasingly distributed across networks. A wide variety of application programs such as word processors, spreadsheets, database managers, program development tools, and the like (collectively, "applications") are found on one or more servers in a network. Sometimes a potential user does not know whether a particular application would be helpful because the user is unfamiliar with that application. Sometimes applications could be made available to those who could benefit from their use, but the necessary file access rights and execution environment have not been provided.

Several standards have been developed to help solve the problem of access across networks, but they also introduce the problem of conflicting standards. One widely used networking protocol model is the Object Request Broker (ORB) model, which allows programs in the form of "objects" to send messages to other objects across a network. However, there are three industry leading but somewhat incompatible implementations of the ORB model. CORBA (Common Object Request Broker Architecture)-allows objects written in any of several CORBA-enabled languages to invoke remote methods of other such objects. The Microsoft COM/ActiveX standard defines interfaces using language-neutral syntax, but ActiveX objects can usually communicate only when Microsoft platforms (such as those using the Windows/Windows NT operating system) are at both ends of the communication. RMI (Remote Method Invocation) allows Java objects access to other Java objects across a network, but not to other types of objects. Object models are also discussed in the Detailed Description. To overcome some of these incompatibilities, object bridges have been created to allow programs to interoperate despite the use of different object models.

Many current networking protocols require that programs be in the form of objects, and a multi-step process must be applied to each object class to remote-enable it. As mentioned earlier, ORB implementations may be incompatible. If an object previously enabled on one version of the standard wishes to talk to an object previously enabled in a different version, the protocols must be translated, and the source code classes must be modified. This modification must be done manually in many cases, although an object bridge may be used in some cases. If the object is to speak to an object which has been enabled on another protocol, then the translation process must be repeated for the other protocol. In short, if the code one wishes to reuse exists on a network, one often faces the task of locating the appropriate code, modifying it manually, and then using it across the network, as described above.

Prior approaches to the problems noted above, and to similar problems, provide limited help. For instance, conventional COM technology promulgated by Microsoft Corporation provides a binary object format requiring all objects to support an IUnknown interface to promote communication between COM objects. COM objects may be written in any of several languages which are supported by Microsoft for this purpose. But COM generally requires manual generation of a language library, provides little or no protocol bridging, and lacks an adequate facility for automatic generation of object stubs. Object stubs are communication modules that make it possible for an object to export its interfaces for use by other objects.

Relatively new ObjectSpace Voyager technology provides a general dynamic wrapping capability, including dynamic byte code generation and wrapping non-objects to make objects (Voyager is a mark of ObjectSpace, Inc.). Voyager technology has been used as a traditional bridge, that is, to bridge disparate object models. But prior to the present invention Voyager technology was apparently not used to bridge between programming languages to promote component reuse. ObjectSpace and ObjectBridge have also provided object model bridges, but to the inventor's knowledge neither addressed the issue of adapting an object for use by multiple languages.

It should also be noted that this technical background was written with knowledge of the present invention, which is a particular solution to problems noted here and/or noted below in the Detailed Description. One of ordinary skill who was not familiar with the invention would not necessarily have turned to ObjectSpace technology for help in finding a solution.

A prior approach investigated by Novell more than one year before the filing of the present application is called here the "oblet" approach. This approach was meant to make runnable software components available through Novell's directory service NDS (NDS is a mark of Novell, Inc.). In an implementation which was at least partially completed, NetBasic scripts were the components, and the environment was Novell's Intranetware platform. Services and applications were to make their presence and services public by representing themselves as a Service or Application Object (called an "oblet") in the NDS tree. The oblet would contain attributes such as methods (actions the oblet can perform), parameter lists (values that must be presented to invoke the oblet methods and/or returned by those methods), and events (notices or signals that may be raised or made to notify someone or some application of some event that occurred). An encoder/decoder for translating parameter blocks from one component format to another was apparently contemplated but not implemented. A dynamic publishing program which automatically updates the NDS tree was apparently also contemplated but not implemented. Dynamic wrapping as claimed in the present invention was apparently not part of the oblet approach, and there may be other differences as well.

The general idea of using NDS technology to administer runnable components also appears in at least U.S. Pat. No. 5,692,129, U.S. Pat. No. 5,761,499, and U.S. Pat. No. 5,893,118, each of which was assigned to Novell. Dynamic wrapping as claimed in the present invention was apparently not part of these prior approaches.

A so-called "Universal Component System" or "UCS" product was released by Novell less than one year before the filing of the present application. The UCS product apparently acts as a conversion layer between rapid application development ("RAD") languages and output components. For instance, the UCS product architecture documents being filed with the Patent Office in Information Disclosure Statements in the present application include a diagram showing conversion from Novell Script for NetWare ("NSN"), Java, C/C++, Perl, and JavaScript to OLE, ActiveX, Java, remote and other components. A UCS Manager allows users to publish OLE Automation components that reside on a Windows 95 or Windows NT workstation into Novell Directory Services. The UCS Architecture is described in more detail in the UCS product architecture documents being filed with the Patent Office. Particular embodiments of the present invention may include various aspects of the UCS product's tools and techniques, and the UCS product will not necessarily be excluded from the scope of claims ultimately issued in this case.

In summary, it would be an advancement in the art to provide new tools and techniques to make it easier for programs written according to different languages and/or different object models to communicate with each other.

Such improved tools and techniques are disclosed and claimed herein.

BRIEF SUMMARY OF THE INVENTION

The invention generalizes the idea of a bridge by allowing access to objects in a manner which is more flexible than conventional approaches. An embodiment of the invention uses dynamic wrapping to package formerly incompatible components as reusable objects which are universally available within the system. For example, an OLE spreadsheet object can be published as a CORBA-usable object, as a Novell NetWare Loadable Module, as a Java Bean usable under the Java/RMI model, and/or as an object usable by any other object model that has been properly registered with the system. Likewise, a programmer writing a C++ language application may invoke useful controls written in other languages. By mixing languages and object models, the system allows connection of disparate software components such as a calendar published as a CORBA service, a mailbox published as an NLM, and a calculator published as a Java Bean.

In short, the invention allows automatic connections between a diversity of object models and programming languages. This removes the need for developers to manually code libraries or other bridges for each language and/or object model or operating system environment used. Instead, developers choose their development environment and then use the invention to publish their code to other environments, including remote ones accessible through a network connection. In some embodiments the invention automatically generates the necessary mapping code, which can also be further customized by hand.

In one embodiment, the invention provides a distributed computing system component architecture for use on a computer network. The architecture comprises a language adapter, an object model adapter, and a core which provides runtime support.

The language adapter contains at least one language template, with each language template specifying at least one mapping between a programming language construct and either an object or an object method. A wide variety of programming languages may be thus adapted, including late bound script languages, interpreted languages, and compiled languages. In particular, the languages Java, Java Script, Perl, Novell Script for NetWare, C, and C++ may be registered through templates which specify mappings between a programming language construct such as a command or struct or function, on the one hand, and an object and/or object method, on the other hand.

The object model adapter contains at least one object management library, with each object management library containing at least an object creation function, an object deletion function, and an object method invocation function. A wide variety of object models may be thus adapted, including those which provide objects such as Java Beans and COM objects. A native NetWare object model may also be provided, with its "objects" being NetWare Loadable Modules that have been dynamically mapped and wrapped according to the invention.

The system's core registers language templates and object management libraries, and automatically translates between programming language constructs and object management library function calls. The core also helps the system provide automatic bridging to at least one reusable component by dynamically wrapping the reusable component in an object if it is not already an object. A component may also be dynamically wrapped if it is an object but has a non-uniform interface relative to other system objects. Through the core, a user can then invoke one or more methods of the object to make the reusable component accessible.

The invention also provides methods for connecting disparate components in a computer and/or a computer network, and storage media configured to perform such methods. One method comprises registering at least two component connection aids, obtaining at least one aid-specific reusable component which is specific to each aid, dynamically wrapping the reusable component as needed to make it an object in the system, and then accessing the object. A component connection aid may include an object management library for a corresponding object model and/or a language template for a corresponding computer language. The objects invoked may be conventional objects, or dynamically mapped and wrapped scripts or NLMS, or other objects. In particular, operating system and directory service methods may be accessed through corresponding objects. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
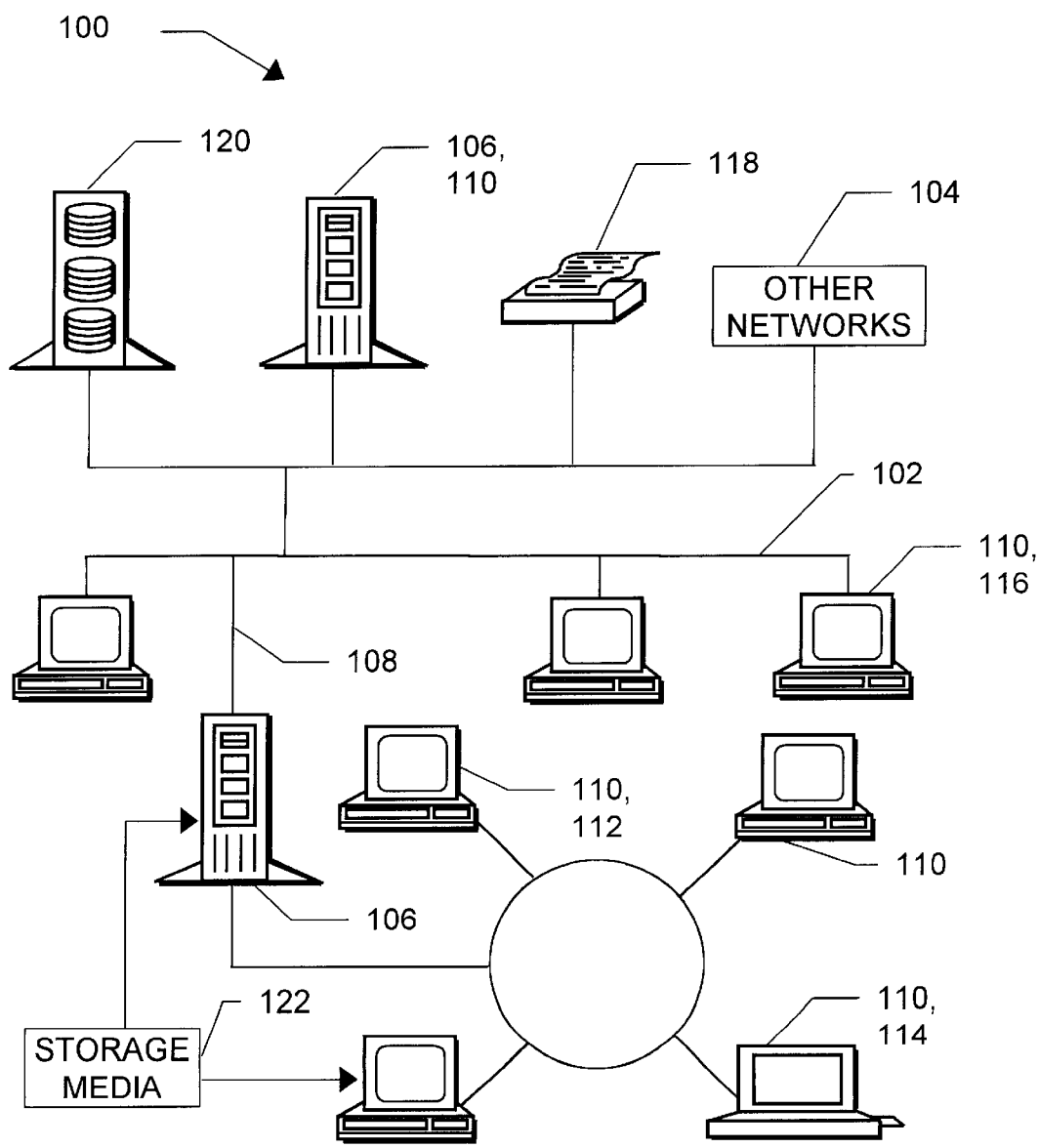
FIG. 1 is a diagram illustrating a computer network and computers which are suitable, individually and collectively, for use according to the present invention.

The present invention relates to methods, systems, signals, and devices for connecting disparate components in a computer network. In particular, the invention provides tools and techniques for dynamically wrapping software components such as scripts to make them accessible as objects in a novel distributed computing system component architecture on a NetWare platform. Various aspects of the invention and its environment are discussed in detail below.

Problems Leading to the Invention

An understanding of the problems which led to the present invention promotes a better understanding of the invention. Such problems are discussed generally in the Technical Background, and they are discussed below with a tighter focus on Novell NetWare platforms. The invention does not necessarily address each of these problems in every embodiment, but it does provide improved tools and techniques in at least some cases.

A first problem was a lack of late bound language support on Novell NetWare platforms. Many operating systems environments provide built-in support for scripting languages, thereby permitting application programs and other software to call operating system primitives as well as the libraries that may come bundled with the script engine. But on the NetWare platform, no such support existed.

Before the present invention, the NetBasic tool provided the ability to run BASIC programming language scripts on a NetWare platform without forcing a developer to write a NetWare Loadable Module ("NLM"). The NetBasic software supported Novell Modular Extensions ("NMX") in an architecture that allowed the NetBasic engine to make calls to functions in NLMs. In using the NMX architecture, developers write NLMs that communicate with an NMX Library Manager to consume services already, written to the NMX architecture, such as NDS access or Oracle database or Btrieve access. The NMX architecture provides NMX and NLM writers with dynamic loading and unloading of service NMXs, which is generally analogous to the use of Dynamic Link Library ("DLL") files on a Microsoft Windows platform. In an NMX system, NLMs could also be created from NetBasic scripts.

The present invention moves beyond the NetBasic approach by introducing the notion of a universal language adapter which allows any scripting engine to hook onto any programmatic object or function that is made available by the invention's kernel. This availability is provided regardless of the programming language used, if templates for the languages are registered. The templates are relatively simple and may be readily understood without access to proprietary source code.

A second problem was that the native NetWare environment did not support encapsulation in the "object oriented" sense. Yet many of the scripts that are written for NetWare platforms behave as self-contained, independent components that could be shared and reused. The invention provides an object model adapter which allows the kernel to invoke functions on components which are already objects and on components which become objects by being dynamically wrapped. The object model adapter thus adapts foreign software objects into entities that an architecture according to the invention understands and can manipulate. This dynamically wrapped adaptation layer allows the platform to support remote objects, as well as putting object wrappers on software components like scripts that are not already in object form. An object may also be wrapped, for convenience or consistency with other system objects.

A third problem with existing approaches was lack of support for shared objects. With the invention, once an object is instantiated and registered inside the core, all languages attached to the universal language adapter share the object instance. This eliminates unnecessary redundancy and allows scripts to share information with each other. For instance, a NetBasic script could invoke a Perl script as a component, as well as make calls into a Java class or calls to an NLM function.

A fourth problem was the lack of a unifying platform for different language types. The "Universal Component System" or UCS product focuses on late-bound languages, but the architecture and methods of the present invention do not limit the invention to late-bound languages. The UCS kernel implementation could be modified to support the autogeneration of libraries for static linking to compiled languages, or an alternate implementation supporting both language types (or only compiled languages) could be provided. In particular, one could readily implement a single framework for exposing all objects, standard or custom services, and NLM Application Program Interfaces ("APIs") on the NetWare platform. Except for NLMs, this has been a missing piece in the NetWare architecture. Even with NLMs, there was little or no runtime support except the support offered by low-level operating system functions.

In a way, the invention is reminiscent of ActiveX on Windows platforms, because it provides an architecture which ensures that a given object can be consumed from any accessible point. Unlike ActiveX, however, embodiments of the invention also provide support for other object models and a broad range of languages which are not chosen by a single object model proponent. The invention also provides a framework for automatically generating networking and object interfaces from code that might not be an object, or that might not be networked. This can be viewed as a kind of redirection for objects, services, and languages, which would be generally analogous to what Novell did previously with redirection for disk drives.

Objects, Object Models, and Operating Systems Generally

In general, an object is a collection of code, data, and/or data structure(s) which can be individually stored and retrieved by name in a computing system. Examples include, without limitation, Java applets and servlets; COM, DCOM, COM+ and OLE objects, CORBA objects; and distributed database or directory service database objects and their attributes.

An object model may be viewed as a distributed object communications paradigm. An object model provides a protocol that allows objects to be used and reused throughout a distributed environment, often with restrictions as to the programming languages and/or operating systems involved.

Common object models include CORBA, Java/RMI, and COM/ActiveX. CORBA uses the Internet Inter-ORB Protocol, contains an Interface Definition Language bridge which allows a supported language to write CORBA controls, and runs on various operating systems. CORBA is an abstract object model in the sense that it is used to create ORB implementations. Using an ORB, a programmer can generate language-neutral objects. The language neutrality is achieved by defining the protocol to be used when making invocations against an object ("service" is the term sometimes used in CORBA).

The COM/ActiveX object model includes the related Microsoft Windows object models DCOM and COM+ and uses the Object Remote Procedure Call protocol. This object model includes an Interface Definition Language bridge that allows a supported language to write COM/ActiveX controls. It normally runs only under some Microsoft Windows operating systems. OLE objects also fall within the COM/Active+object model. Language neutrality in COM is achieved by having all objects adhere to the COM specification, which prescribes what interfaces to implement, and the layout in memory at execution time of the executable code, thus allowing any program in the computer to find the method to invoke on an object.

The Java/RMI object model uses Java Remote Method Protocol. Only the Java programming language may be used to write controls (known as Java Beans), but the object model runs on a wide variety of operating systems by virtue of using the Java Virtual Machine.

Computers and Networks Generally

Distributed computing systems which may be configured according to the invention include computer networks, both individually and in aggregations, as well as mobile computers which are connectable to such networks. By way of example, suitable computer networks include local networks, wide area networks, and/or the Internet. "Internet" as used herein includes variations such as a private Internet, a secure Internet, a value-added network, a virtual private network, or an intranet. The computers connected by the network may be workstations, laptop computers, disconnectable mobile computers, file servers, or a combination thereof. The network may include one or more LANs, widearea networks, Internet servers and clients, intranet servers and clients, or a combination thereof.

One of the many computer networks suited for use with the present invention is indicated generally at 100 in FIG. 1. In one embodiment, the system 100 includes Novell NetWare® network operating system software (NETWARE is a registered trademark of Novell, Inc.). In alternative embodiments, the system 100 includes NetWare Connect Services, VINES, Windows NT, Windows 95, Windows 2000, LAN Manager, or LANtastic network operating system software and/or an implementation of a distributed hierarchical partitioned object database according to the X.500 protocol such as Novell Directory Services or LDAP directory services (VINES is a trademark of Banyan Systems; NT, WINDOWS 95, WINDOWS 2000, and LAN MANAGER are trademarks of Microsoft Corporation; LANTASTIC is a trademark of Artisoft). The system 100 may include a local area network 102 which is connectable to other networks 104, including other LANs or portions of the Internet or an intranet, through a gateway or similar mechanism.

The illustrated system 100 includes several servers 106 that are connected by network signal lines 108 to one or more network clients 110. The servers 106 and clients 110 may be configured by those of skill in the art in a wide variety of ways to operate according to the present invention. The servers 106 may be configured as Internet servers, as intranet servers, as directory service providers or name servers, as software component or other object servers, or as a combination thereof The servers 106 may be uniprocessor or multiprocessor machines. The servers 106 and clients 110 each include an addressable storage medium such as random access memory and/or a nonvolatile storage medium such as a magnetic or optical disk.

Suitable network clients 110 include, without limitation, personal computers 112, laptops 114, workstations 116, dumb terminals, information appliances, personal digital assistants, and other handheld and/or embedded processing systems. The signal lines 108 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media (volatile and/or nonvolatile).

In addition to the network client computers 110, a printer 118 and an array of disks 120 are also attached to the particular system 100 shown, as examples of other network nodes or devices. A given computer may function both as a client 110 and as a server 106; this may occur, for instance, on computers running Microsoft Windows NT or Windows 2000 software. Although particular individual and network computer systems and components are shown, those of skill in the art will appreciate that the present invention also works with a variety of other networks and computers.

The servers 106 and the clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, RAM, flash memory, and other computer system storage devices. The substrate configuration represents data and instructions which cause the computer system to operate in a specific and predefined manner as described herein. Thus, the medium 122 tangibly embodies a program, functions, and/or instructions that are executable by the servers 106 and/or network clients 110 to perform registering, component obtaining, dynamic wrapping, object method invoking, and other method (i.e., claimed process) steps of the present invention substantially as described herein.

Architecture Example

Figure 2:
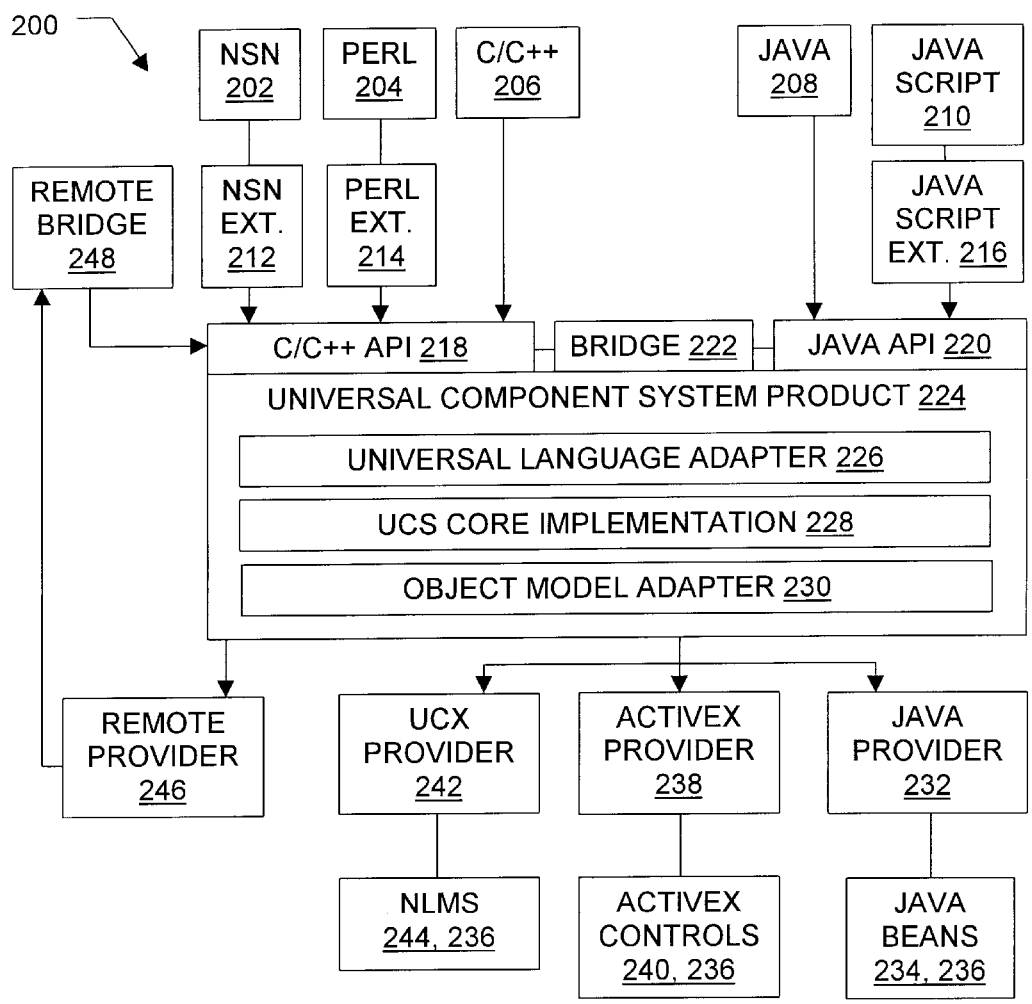
FIG. 2 is a diagram illustrating an architecture according to the present invention.

FIG. 2 illustrates generally a UCS product architecture 200 in a sample environment such as the network 100; this figure also appears in much the same form in the UCS product literature. As noted, the UCS product includes a limited implementation of the present invention as presently contemplated; the illustrated architecture is an example of an architecture according to the present invention. For instance, the illustration shows several specific programming languages, namely, Novell Script for NetWare 202, Perl 204, C/C++ 206, Java 208, and Java Script 210, but the languages involved in a particular embodiment of the invention may vary. Another embodiment could support Visual Basic, for example, and/or various compiled languages such as FORTRAN and COBOL and/or interpreted languages such as LISP.

Each of the pure scripting languages (NSN 202, Perl 204, and Java Script 210) accesses objects under UCS through a corresponding adapter, called an "extension" (indicated at 212, 214, 216, respectively). These extensions are examples of language template libraries according to the invention. Each language template includes a specification that explains what a component in the language looks like to UCS, and the corresponding library implements that interface.

For instance, a language template might contain information indicating that an object instantiation function takes three parameters: the name of the class to be instantiated, the name by which the resulting object will be known in the programming language (e.g., Perl) in question, and an environment parameter. The environment parameter is used to pass information in case the language requires language-specific control structures. For instance, the environment parameter can be used to store stateful information which has meaning to Perl, and this parameter will be passed back to the Perl interpreter on all invocations to another object by a Perl object.

The C/C++ language 206, and the Perl and NSN languages through their extensions 212, 214, each access objects through a C/C++ UCS API 218. Java 208 and the Java Script extension 216 access objects through a similar Java UCS API 220. A conventional language bridge 222 may connect the two APIs 218, 220. The APIs 218, 220 provide calls into a UCS product 224, such as calls to create objects, delete objects, or invoke methods of objects, as well as calls to register or unregister a language and its template (including an extension if necessary).

The UCS product 224 includes a universal language adapter 226, a kernel or core 228, and an object model adapter 230. The universal language adapter 226 allows the UCS product 224 to interface into any registered scripting or other programming language. When a user writes to the UCS product 224, the universal language adapter 226 abstracts the script commands, for instance, and places them in a form recognized by the UCS core 228, namely, calls to create or delete objects or to invoke an object method. The core 228 is thus a mapping layer or engine which converts script commands from the universal language adapter 226 into calls to the object model adapter 230. The object model adapter 230 instantiates all mapping objects into the core 228, which manages the registry of languages and object models.

The object model adapter 230 communicates with one or more component providers (also known as "object management libraries"). As examples, the illustration shows a Java component provider 232 which provides access to Java and Java Beans 234 (Java Beans are one kind of component 236); an ActiveX component provider 238 which provides access to ActiveX controls 240 (which are a second kind of component 236); and a UCX component provider 242 which provides access to NLMs 244 (a third kind of component 236). The released UCX provider 242 supports writing component NLMs 244 in C or NSN. The ActiveX provider 238 works with a UCS manager utility to permit users to publish (in NDS) OLE automation components residing on a Microsoft Windows workstation, thereby allowing other workstations in a network such as the network 100 to subscribe to these components and then access them remotely through OLE automation controllers such as Microsoft Visual Basic software.

A remote provider 246 provides object access through a remote bridge 248 and the UCS product 224. The remote provider 246 may provide access, for instance, to an OLE component 236 by using remoting technology to get through to a Windows NT or OLE server 106. This may include tunneling through an "NSAPI" Netscape web server API and/or an "ISAPI" Windows NT web server API. The remote provider 230 accepts calls from the object model adapter 246, uses standard network technology such as the remote bridge 248 to contact remote objects, and relays parameters and results. The remote provider 230 may communicate via the network with another remote provider 246 at the remote location, or it may communicate with another object model provider (e.g., provider 242, 238, or 232), or with remote UCS product code as illustrated.

Each provider includes code written to the UCS product (or other embodiment) using a particular API set tailored to the object model for which the provider provides objects and object access. The providers included with the UCS product release allow the writing of scripts and programs which dynamically load only the functionality required at execution time. A UCX Manager utility loads and unloads the UCS components from the four providers illustrated; other providers may be handled similarly.

In short, the UCS architecture 200, like the inventive architecture in other embodiments, provides versatility by letting a programmer use any programming language in the system to access any reusable component in the system. Using a simple interface (create object, destroy object, invoke object method), the UCS architecture 200 can run interoperable Novell Script for NetWare (NSN), Java, Java Script, Perl, C, and C++ programs to provide Web scripting and server-side functionality. Languages that are otherwise largely incompatible and lack any component-based programming features can interoperate through the UCS architecture 200. The architecture 200 also exposes the wealth of Novell NetWare and NDS services to the scripting community in a manner which is not necessarily limited by one's preferred development environment.

The UCS architecture 200 thus provides a middle-tier solution for development on the NetWare platform. It makes the existing NetWare services relatively easy to consume and build into Internet and intranet solutions, and it provides an open standards-based solution. Because components may be run on either the local server or on a remote server, developers can use components that do not exist in the local execution environment. Remoting of components may be done through an event-passing protocol that leverages Web technologies such as TCP/IP.

Methods

Figure 3:
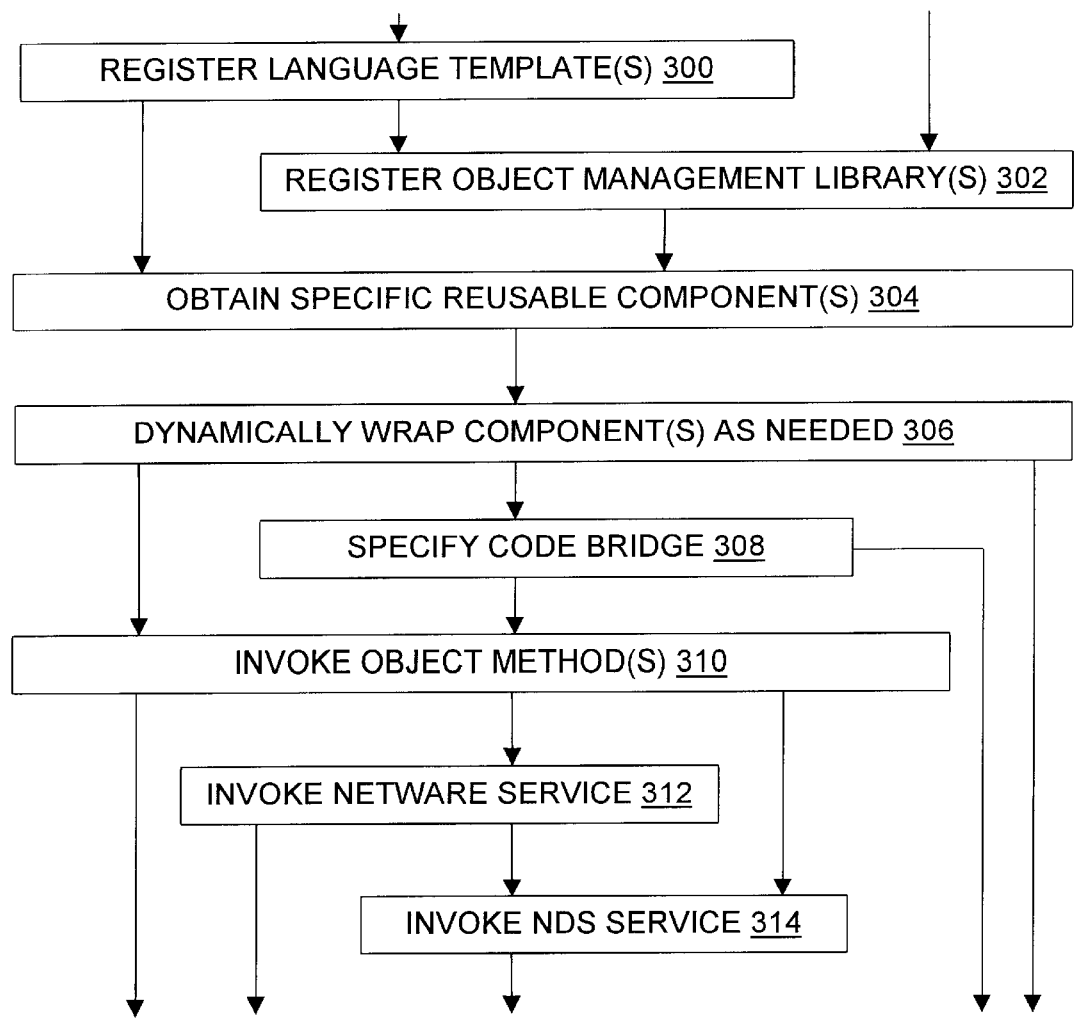
FIG. 3 is a flowchart illustrating methods of the present invention.

FIG. 3 illustrates methods of the present invention for connecting disparate components in a computing system such as a computer or a computer network. Although particular methods and systems embodying the present invention are expressly illustrated in FIGS. 1, 2 and/or described in the text herein, it will be appreciated that other embodiments may also be formed according to the present invention. Unless otherwise expressly indicted, the description herein of methods and configured storage media of the present invention therefore extends to corresponding systems, and the description of architectures or other systems of the present invention extends likewise to corresponding methods and configured storage media.

A language template registering step 300 and an object management library registering step 302 are examples of steps which register at least one component connection aid. A component connection aid includes a language template and/or an object management library. Registration during step 300 and/or step 302 makes an entry or a database object in NDS or some other registry, database, or administrative file.

To register a language template during step 300, a developer, administrator, or other user (which may also be a process running on behalf of some person) provides the universal language adapter 226 or its equivalent with the following information about the programming language in question:

a name or other identifier specifying the language;
  a specification for an object instantiation function that is callable from the language;
  a specification for an object method invocation function that is callable from the language; and
  a specification for an object deletion function, if any, callable from the language;

The specification for the object instantiation function callable from Perl, for instance, specifies three parameters as discussed in connection with FIG. 2. With languages that do not require an environment parameter, the specification for the object instantiation function callable from those languages would only include the first two parameters (object class to instantiate, and name of the resulting object in the language).

The specification for the object method invocation function callable from a given language specifies the parameters for that function. These include the name of the object and method being invoked, the manner of passing parameters to the method (e.g., by address or by value), and the manner of receiving the result, if any, which is returned from the invoked method.

The specification for the object deletion function callable from a given language specifies first whether such a function exists. Some configurations may rely on garbage collection techniques in the system to free memory and other resources, instead of requiring explicit releases of each object by the calling program. If present, the object deletion function's parameters would generally be the name or other identifier of the object to release, and an indication of how the return status code (if any) is to be passed to the calling language.

The registration step 300 may also include providing a library, such as a Perl extension 214. The Perl library implements the particular set of interfaces that allow a Perl developer to instantiate, invoke, and release a Perl program's use of an object containing a component in Perl or some other language.

An object management library includes a provider such as Java provider 232, an ActiveX provider 238, or a UCX provider 242. To register such an object management library during step 302, a user provides the object model adapter 230 or its equivalent with the following information about the provider, and hence about the object model in question:

a name or other identifier specifying the object model;
  a function callable from the object model adapter 230 which creates an object in the object model using parameters such as the object class name and the resulting object name;
  a function callable from the object model adapter 230 to invoke an object method according to the object model, using parameters such as the object name, the method name, a list of zero or more method parameters, and a variable to hold the result, if a result value is returned by the method, and
  a function callable from the object model adapter 230 to release (i.e., delete, deallocate, free) an object according to the object model;

During a step 304, the user provides to the system at least one reusable component. The reusable component is identified to or by the corresponding provider. The reusable component may already be an object according to one of the object models, or it may be a program component that is not such an object. For instance, a Perl script is not an object in the object-oriented programming sense, but it is a reusable component. By making it an object during a dynamic wrapping step 306, the invention makes the script callable from Java or C++, for instance. A component which is already an object may also be wrapped during step 306 to provide a uniform interface for objects in the system. The dynamic wrapping step 306 may be accomplished using the dynamic object generation capabilities of ObjectSpace Voyager technology, or similar technology.

During an optional bridge specifying step 308 the automatic bridging provided by the system may be overridden by specifying a manually prepared and/or manually identified code bridge. That is, assume there exists between at least two of the object models a conventional code bridge or a custom bridge that was created manually. With step 308, the method includes invoking one or more methods of a dynamically wrapped object by specifying the code bridge to be used to make the dynamically wrapped object accessible outside its object model.

During an invoking step 310 the connections provided by the UCS product 224 or another product according to the invention are used to provide access between disparate components. For instance, a Perl script may invoke a Java object method, a Java object may invoke an NLM or NMX function, or a NetBasic script may invoke an ActiveX control. The invoking step 310 may invoke late bound language components such as scripts, as well as code from prepackaged executables such as COM objects. Regardless of whether a given developer chooses an object-oriented environment or a script environment, the invention provides a way for disparate components to interact as if they all belong to a single uniform environment. To a Perl developer, objects in the system look like Perl commands, but to a Java developer, a Perl command looks like a Java object. This is made possible by the combination of "mapping and wrapping" discussed herein.

During an optional NetWare invoking step 312, the invoking step 310 specifically invokes a NetWare service, such as on or more file access services, security services, process control or scheduling services, and so on. During a similar optional NDS invoking step 314, the invoking step 310 specifically invokes an NDS service, such as a directory search, a directory update, or a directory object retrieval. Either or both of the steps 312, 314 may be accomplished by invoking a dynamically wrapped NLM through the UCX provider 242.

Steps according to the present invention may be performed in an order other than that shown, may be performed concurrently, may be repeated, may be omitted, and/or may be renamed or grouped differently than shown, provided they accomplish the claimed process. For instance, the registering steps 300, 302 may be performed in the opposite order or in an interleaved manner, and they may each be repeated to perform several language and/or object model registrations. Likewise, the bridge specifying step 308 may be omitted. As shown, the claimed process as performed by a particular user may end after preparing components during step 306, with subsequent invoking steps 310 possibly being performed later by some other user. Several people operating on behalf of an organization may also perform different steps of the claimed process, in which case the organization rather than the individuals would be viewed as the user. Similar considerations apply to FIG. 2, in that the architecture may have repeated elements, omitted elements, and differently grouped or named elements, in different embodiments of the invention.

In addition, those of skill in the art will appreciate that a wide variety of data structure field orderings, data sizes, and data encodings, and other variations are possible in embodiments of the invention. The language templates, providers, and system elements such as the language adapter 226, core 228, and object model adapter 230, may be embodied in the system in various media. For instance, they may include data structures and/or program instructions stored on a disk or in RAM memory, or signals on network communication lines 108.

SUMMARY

The present invention provides flexible connections to disparate software components in a computer system using a relatively simple architecture. A language adapter (and its constituent templates and libraries) maps programming languages to a general object interface. The object interface supports object creation, object method invocation, and optionally supports object deletion. An object model adapter in turn maps the general object interface to specific object models such as ActiveX, Java, or a native NetWare object model supporting wrapped NLMs. If a software component is not already an object, it is dynamically wrapped within an object by the system.

Although limited object model bridges, source code translators, and other tools have been made preciously available to address the proliferation of programming languages and object models, the invention provides new tools and techniques for connecting otherwise disparate environments. A common object wrapper, provided by the invention at runtime, is used by the language adapter to bridge between programming languages and by the object model adapter to make one object visible in multiple object models.

This flexibility allows a developer to choose a specific language and a specific object model, develop useful code, and then make the code widely available through a network server. In effect, code written in one language is exported to other languages and to other object models. The invention can also automatically generate the network bindings for the component so that the component is accessible from a variety of network protocols. The developer can leave the choice of client and deployment to the person that will be using or administering the component. The invention also provides a framework to which NetWare and Novell directory services can be added, making them available to any or all of the components that have been adapted into the system.

As used herein, terms such as "a" and "the" and item designations such as "template" are generally inclusive of one or more of the indicated item. In particular, in the claims a reference to an item generally means at least one such item is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A distributed computing system component architecture for use on a computer network, the architecture comprising:

a language adapter containing at least one language template, each language template specifying at least one mapping between a programming language construct and at least one of an object and an object method;

an object model adapter containing at least one object management library, each object management library containing at least an object creation function, an object deletion function, and an object method invocation function; and a core which registers language templates and object management libraries, automatically translates between programming language constructs and object management library function calls, and provides automatic bridging to at least one reusable component by dynamically wrapping the reusable component in an object if it is not already an object so as to package the formerly incompatible component as a reusable object universally available within the distributed computing system, whereby the architecture allows a user to access the reusable component by invoking one or more methods of the object.

2. The architecture of claim 1, wherein the object model adapter contains an object management library for managing COM/ActiveX objects on the computer network.

3. The architecture of claim 1, wherein the object model adapter contains an object management library for managing Java/RMI objects on the computer network.

4. The architecture of claim 1, wherein the object model adapter contains an object management library for managing CORBA objects on the computer network.

5. The architecture of claim 1, wherein the object model adapter contains an object management library for managing NetWare Loadable Module objects on the computer network.

6. The architecture of claim 1, wherein the object model adapter contains a remote object management library for managing remote objects on the computer network.

7. The architecture of claim 1, further comprising the computer network, which includes at least two computers connected by at least one communications link.

8. The architecture of claim 1, wherein the language adapter contains a Java language template specifying at least one mapping between a Java programming language construct and at least one of an object and an object method.

9. The architecture of claim 1, wherein the language adapter contains a Perl language template specifying at least one mapping between a Perl programming language construct and at least one of an object and an object method.

10. The architecture of claim 1, wherein the language adapter contains a Novell Script for Netware language template specifying at least one mapping between a Novell Script for Netware language construct and at least one of an object and an object method.

11. The architecture of claim 1, wherein the language adapter contains a C/C++ language template specifying at least one mapping between a C/C++ programming language construct and at least one of an object and an object method.

12. The architecture of claim 1, wherein the language adapter contains a Java Script language template specifying at least one mapping between a Java Script programming language construct and at least one of an object and an object method.

13. The architecture of claim 1, wherein the language adapter further comprises an extension which allows a pure scripting language to access the corresponding language template.

14. A method for connecting disparate components, the method comprising the steps of:
   registering at least two object management libraries for at least two corresponding disparate object models;
   for each object model, obtaining at least one model-specific reusable component which is specific to that object model; and
   for each model-specific reusable component, dynamically wrapping the reusable component in an object if it is not already an object and then invoking one or more methods of the object through the corresponding object management library, thereby making the model-specific reusable component of each object model accessible to the model-specific reusable component of the other object model so as to package the formerly incompatible component as a reusable object universally available within a distributed computing system, such as to allow a user to access the reusable component by invoking one or more methods of the object.

15. The method of claim 14, wherein at least one code bridge exists between at least two of the object models, and wherein the method comprises invoking one or more methods of a dynamically wrapped object by specifying a code bridge to be used to make the dynamically wrapped object accessible outside its object model.

16. The method of claim 14, wherein the method further comprises the steps of:
   registering at least one language template for at least one corresponding computer language;
   obtaining at least one language-specific reusable component which is specific to the language template computer language; and
   dynamically wrapping the language-specific reusable component in an object if it is not already an object and then invoking one or more methods of the object through the corresponding language template, thereby making the language-specific reusable component accessible to at least one other reusable component.

17. The method of claim 16, wherein at least two language templates are registered, at least one language-specific reusable component is obtained for each language template, and wherein the language-specific reusable component of each corresponding language template is accessible to the language-specific reusable component of the other language template.

18. A computer storage medium having a configuration that represents data and instructions for connecting disparate components in a NetWare computer network, comprising:
   registering at least two component connection aids, each aid comprising at least one of an object management library for a corresponding object model and a language template for a corresponding computer language;
   for each component connection aid, obtaining at least one aid-specific reusable component which is specific to that aid;
   for each aid-specific reusable component, dynamically wrapping the reusable component as needed, thereby making the aid-specific reusable component of each component connection aid into an object which is accessible to the aid-specific reusable component of the other component connection aid so as to allow for the connection of disparate software components; and then after the wrapping step
   invoking one or more methods of at least one such object.

19. The configured storage medium of claim 18, wherein the registering step registers at least one object management library which provides an object deletion function for deleting objects.

20. The configured storage medium of claim 18, wherein the registering step registers at least one object management library which provides an object creation function for creating objects.

21. The configured storage medium of claim 18, wherein the registering step registers at least one object management library which provides an object invocation function for invoking a method of an object.

22. The configured storage medium of claim 18, wherein the registering step registers at least one object management library which provides network interface function for using an object remotely over a network connection.

23. The configured storage medium of claim 18, wherein the method further comprises the object invoking a NetWare service.

24. The configured storage medium of claim 18, wherein the method further comprises the object invoking an NDS service.

* * * * *